United States Patent [19]
O'Brien

[11] Patent Number: 6,111,946
[45] Date of Patent: Aug. 29, 2000

[54] METHOD AND SYSTEM FOR PROVIDING ANSWER SUPERVISION IN A SWITCHED TELEPHONE NETWORK

[75] Inventor: William G. O'Brien, Orleans, Canada

[73] Assignee: Bell Canada, Montreal, Canada

[21] Appl. No.: 09/015,350

[22] Filed: Jan. 29, 1998

[51] Int. Cl.[7] .................................................. H04M 7/00
[52] U.S. Cl. ......................... 379/230; 379/145; 379/207; 379/222
[58] Field of Search .................................. 379/230, 229, 379/265, 207, 219, 221, 231, 1, 32, 34, 111, 112, 133, 145, 143, 154, 188, 189, 222; 370/242

[56] References Cited

U.S. PATENT DOCUMENTS

| | | | |
|---|---|---|---|
| 3,806,652 | 4/1974 | Woolf et al. ........................... | 179/7.1 R |
| 3,925,623 | 12/1975 | Tysseland ............................. | 179/18 FH |
| 3,963,874 | 6/1976 | Pommerening et al. ........... | 179/18 AB |
| 4,277,648 | 7/1981 | Glassman ............................. | 179/7.1 R |
| 4,404,433 | 9/1983 | Wheeler et al. .................... | 179/7.1 TP |
| 4,656,657 | 4/1987 | Hnsicker ............................ | 379/140 |
| 4,811,378 | 3/1989 | Else et al. .......................... | 379/189 |
| 5,134,651 | 7/1992 | Oritz et al. ......................... | 379/112 |
| 5,146,490 | 9/1992 | Beckman ............................ | 379/113 |
| 5,377,186 | 12/1994 | Wegner et al. ..................... | 379/201 |
| 5,539,802 | 7/1996 | De Caluwé et al. ............... | 379/13 |
| 5,586,177 | 12/1996 | Farris et al. ........................ | 379/230 |
| 5,774,530 | 6/1998 | Montgomery et al. ............. | 379/112 |
| 5,793,839 | 8/1998 | Farris et al. ........................ | 379/34 |
| 5,802,145 | 9/1998 | Farris et al. ........................ | 379/34 |
| 5,805,675 | 9/1998 | Chanda ............................... | 379/93.14 |
| 5,854,835 | 12/1998 | Montgomery et al. ............. | 379/119 |
| 5,920,562 | 7/1999 | Christie et al. ..................... | 370/395 |
| 5,949,864 | 9/1999 | Cox ..................................... | 379/189 |

*Primary Examiner*—Harry S. Hong
*Assistant Examiner*—Benny Q. Tieu
*Attorney, Agent, or Firm*—Thomas, Kayden, Horstemeyer & Risley, L.L.P.

[57] ABSTRACT

A method and system for providing answer supervision in a switched telephone network are described. The method involves monitoring signaling links in a common channel signaling system to track call progress. If a called number is determined to be suspect with respect to providing call answer indications, the system may route calls to monitored facilities which measure the commencement of payload traffic. When payload traffic is detected, a call answer message can be sent through the signaling network to initiate billing, or call release messages may be sent in each direction to cancel the call. Both inter-network and intra-network calls can be monitored to provide answer supervision and ensure that toll calls are properly billed in accordance with actual toll facility usage.

38 Claims, 12 Drawing Sheets

METHOD AND SYSTEM FOR PROVIDING ANSWER SUPERVISION IN A SWITCHED TELEPHONE NETWORK

TECHNICAL FIELD

This invention relates generally to the control of telephone calls in a switched telephone network and, in particular, to a method and system for controlling telephone calls to call terminating equipment that fails to provide a call answer indication to the network.

BACKGROUND OF THE INVENTION

Modern switched telephone networks are controlled using a separate signaling network called a Common Channel Signaling (CCS) system to set up and tear down intra-network and inter-network telephone calls. In North America, most switched telephone networks operate using a CCS protocol known as Signaling System Seven (SS7). The SS7 protocol provides detailed procedures for call set-up and tear down. All network functions revolve around and depend upon a strict adherence to those procedures. Auxiliary functions such as toll call billing are dependent upon the signaling protocol prescribed by SS7. It is known, however, that under certain circumstances, signaling procedures are innocently or deliberately not complied with by certain call terminating equipment. This non-compliance can result in a significant loss of revenue for telephone service providers.

For example, it is known that an answer indication is not always returned by equipment connected to a switched telephone network. It is also known that certain switched telephone networks or elements in certain switched telephone networks may fail to provide an answer indication on call completion. This problem is referred to as "no answer supervision" and it appears to account for the greatest source of revenue loss suffered by telephone service providers in North America. For example, it has been determined by actual measurement that in 1997 Bell Canada averaged 300,000 to 400,000 unbilled toll call minutes per day as a result of no answer supervision. It can be extrapolated that in North America, in excess of 3 to 4 million minutes per day are unbilled as a result of no answer supervision.

The equipment most often responsible for no answer indication is the Private Branch Exchange (PBX) connected directly to a switching node of a telephone service provider. PBXs are complex parameter driven pieces of equipment and the lack of answer indication is not necessarily consistent or intended to deceive. For example, a PBX which provides an answer indication during business hours may not do so when switched to "night answer". Since a PBX administrator may not be aware of this problem, it is not likely to be corrected.

Another network element that frequently fails to provide an answer indication on call completion is the Interactive Voice Response (IVR) unit which is increasingly used in the modern Public Switched Telephone Network (PSTN). IVRs were traditionally excluded from a requirement to provide answer indications on the theory that they were only used to provide call information or call redirection. Such units are now used for a variety of other services, however, such as voice mail, order entry, facsimile store and forward, etc. Calls to IVRs now consume tens of thousands of minutes of network resources daily and most of those minutes are not billed.

A further source of lost revenues are calls switched to other switched telephone networks in the PSTN which fail to provide an answer indication on call completion. If no answer indication is provided, the calls cannot be billed or included in inter-network rate settlements, which can likewise lead to significant loss of revenue.

The problem of answer supervision has been addressed for individual pieces of equipment such as an autonomous pay telephone described in U.S. Pat. No. 5,134,651 which issued to Ortiz et al. on Jul. 28, 1992. Ortiz et al. describe a method and apparatus for telephone call answer supervision, capable of detecting the completion of both national and international calls, which employ different answer confirmation formats. The apparatus also provides confirmation that a placed call has been answered if at least one of the following conditions occurs:

1) a tone of given frequency, transmitted on the transmit line of a telephone, is detected and received back on the received line; and
2) audio activity having a non-repetitive cadence is detected on both transmit and receive lines of the telephone.

Ortiz et al. also describe an autonomous pay telephone, such as a mobile telephone, which includes an arrangement for determining and accessing a call rate, per unit of time, for a call placed to a given telephone number, a display for displaying, in real-time as the call progresses, charges for a completed call as well as an accounting arrangement for storing charges assessed for each completed call.

Although specialized pieces of equipment such as that described by Ortiz et al. provide answer supervision, there exists a need for a method and a system for providing answer supervision in a switched telephone network so that significant revenues are not lost as the result of equipment or networks which fail to provide an answer indication on call completion.

SUMMARY OF THE INVENTION

It is an object of the invention to provide a method for answer supervision in a switched telephone network which is capable of isolating called numbers that fail to provide an answer indication.

It is a further object of the invention to provide a method of handling calls to called numbers that fail to provide an answer indication so that the calls may be monitored to detect payload traffic on the call path even though an answer indication has not been provided at the called number.

It is yet a further object of the invention to provide a method of answer supervision in a switched telephone network wherein on detection of payload traffic on the call path, common channel signaling messages may be generated and transmitted into the common channel signaling network to cancel the call or provide an answer indication to ensure that the call is billed in accordance with ensuing usage of the network facilities.

It is yet a further object of the invention to provide a system for answer supervision in a switched telephone network which permits individual calls made using network facilities to be tracked to determine whether the called number is providing an answer indication on call completion.

It is yet a further object of the invention to provide a system for answer supervision in a switched telephone network which permits called numbers which do not provide an answer indication to be automatically or substantially automatically monitored to detect payload traffic on the call path and to control the call once payload traffic is detected.

The invention therefore provides a method of providing answer supervision for calls in a switched telephone network, comprising the steps of:

monitoring call set-up messages exchanged over a common channel signaling system of the switched telephone network to determine whether a call answer message is received from a terminating end of the call before a predetermined criteria respecting the call is satisfied; and generating at least one common channel signaling message to control the call in an instance when the call answer message is not received before the predetermined criteria respecting the call is satisfied.

The invention also provides a method of providing answer supervision for toll calls in a switched telephone network, comprising the steps of:

monitoring common channel signaling links to detect call control messages;

copying call control messages to a data processing unit which tallies the messages to track the progress of individual calls;

determining at the data processing unit when the progress of an individual toll call fails to conform to an expected call pattern because the switched telephone network does not recognize the call as having been answered; and acting to control the individual call or acting to ensure that other calls to a same called number as the individual call are routed to ensure that they may be controlled.

The invention further provides a system for providing answer supervision for toll calls in a switched telephone network, comprising:

means for monitoring at least one common channel signaling link in a common channel signaling system for controlling the switched telephone network to track the progress of individual calls having control messages carried by the at least one common channel signaling link; and means for generating common channel signaling messages and transmitting the common channel signaling messages into the common channel signaling system to control the progress of calls determined by the means for monitoring to be calls which do not conform to an expected call pattern respecting call answer.

The method and the system in accordance with the invention therefore enable telephone service providers to contain revenue losses due to no answer indications from terminating call equipment.

In accordance with the method, signaling links in the common channel signaling system of a switched telephone network are monitored to track individual call progress. Common channel signaling message monitoring is accomplished in real-time using signal link monitors or Intelligent Signal Transfer Points (ISTPs), for example. The signal link monitors or ISTPs preferably copy at least certain call control messages to a data processing unit referred to as an Answer Supervision Analyzer (ASA). The ASA tallies CCS messages to track individual call progress and determine whether an answer indication or a call release message is received for each call within a preset time interval, which may be dependent on conditions or implementation. This process is also preferably accomplished in real-time. If the ASA detects an unreleased call for which no answer indication has been provided within the time interval, the ASA prepares an alert message which it forwards to an Answer Supervision Controller (ASC). The ASA provides the ASC with data about the call, including the called number. On receipt of the alert message, the ASC may add the called number immediately to a list of numbers to be monitored, store an indication that a called number failed to return an answer indication, or return a message to the ASA that no further alerts respecting that number are to be reported.

Alternatively, the voice path may be monitored using a voice path monitor (VPM) to determine whether the voice path for the call is carrying payload traffic (voice, data or facsimile). The VPM preferably updates a table at the ASC, indicating the real-time, or near real-time, status of the voice path. If payload traffic is reported on the voice path, the ASC may force a CCS Answer (ANM) message to be sent back to the originating switch to initiate billing, or may force call release. The action taken by the ASC is preferably determined in a rule base maintained by an administrator of the system.

If the ASC determines that the called number should be monitored, it may dispatch a monitor request message to an Operations Support System (OSS) requesting that future calls made to the called number be routed to monitoring equipment. Preferably, the monitoring equipment is connected to a loop-back trunk group provided at a network switching node which serves the called number. The OSS may update translation tables in that network switching node to route inbound calls to the called number through the loop-back trunk group. The monitoring equipment connected to the loop-back trunk group can be used to detect the onset of payload traffic in completed calls.

As discussed above, when payload traffic is detected in the call path of a monitored call, the ASC may respond with an appropriate action to control the call. In accordance with two preferred options, the ASC may instruct a Virtual Network Element (VNE), which is typically a virtual node in the switched telephone network and a physical node in the common channel signaling system, to generate common channel signaling messages for controlling the call. The VNE may generate an SS7 Answer Message (ANM) which it transmits through the common channel signaling network towards an originating end of the call to ensure that billing for the call commences. Alternatively, the VNE may generate and transmit SS7 Release Messages (REL) towards both the originating and terminating ends of the call connection to cancel the call. The action taken is determined by network administrators who maintain the rule base in the ASC.

The method and apparatus in accordance with the invention therefore provide a versatile and effective means for controlling a significant source of revenue loss in a switched telephone network.

BRIEF DESCRIPTION OF THE DRAWINGS

The invention will now be explained by way of example only and with reference to the following drawings, wherein.

DETAILED DESCRIPTION OF THE PREFERRED EMBODIMENT

This invention relates to a method and a system for providing answer supervision in a Switched Telephone Network (STN). The method involves the monitoring of call set-up messages exchanged over a common channel signaling system of the STN to determine whether a call answer message is received from a terminating end of the call before a predetermined criteria respecting the call is satisfied. The predetermined criteria may be, for example, the detection of the payload traffic in the voice path for the call. Other criteria may likewise be used, including a default time interval. If an answer message is not received before the predetermined criteria is satisfied, at least one common channel signaling message may be generated to control the call. The common channel signaling message may be an SS7 answer message (ANM) which is sent in an originating direction of the call in order to commence billing, or SS7 Release Messages (REL) may be sent in both directions in order to cancel the call and thus encourage the terminating end to enable an answer indication on call completion. Many options are available for implementing the invention in an STN. A few examples of those options are described below.

Figure 1:
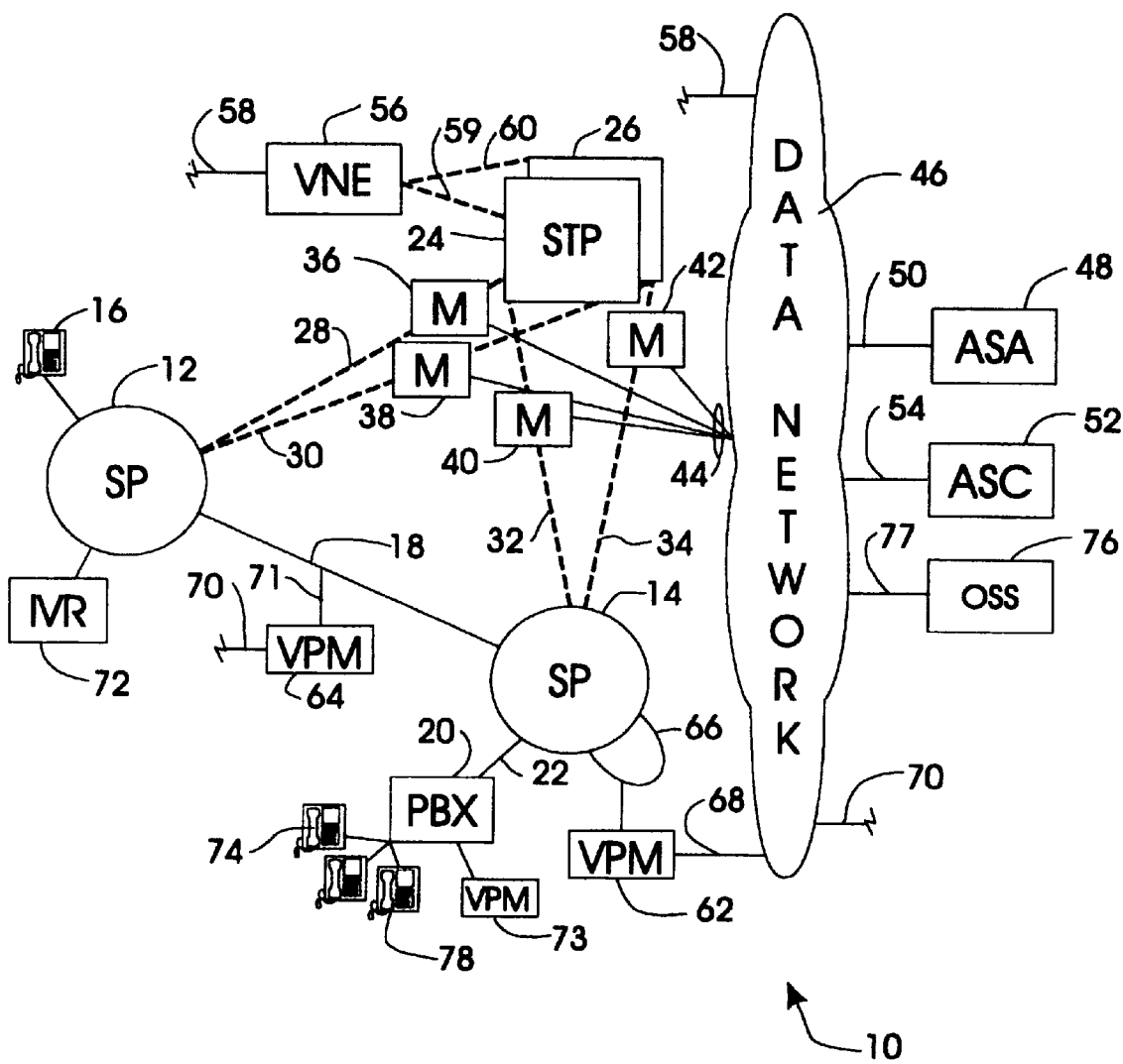
FIG. 1 is a schematic diagram of a small portion of a switched telephone network (STN) showing one arrangement for apparatus in a system in accordance with the invention.

FIG. 1 is a schematic diagram of a small portion of an STN equipped with components of a system in accordance with the invention. The STN, generally indicated by reference 10, includes a plurality of switching nodes commonly referred to as Switching Points (SPs). For purposes of clarity, only two SPs 12 and 14 are illustrated. As is well understood in the art, each SP 12, 14 has a line side to which subscriber equipment is connected and a trunk side for connecting each SP 12, 14 to other SPs in the network. A subscriber telephone 16 is connected to the line side of SP 12. An inter-switch trunk 18 interconnects SPs 12, 14. A Private Branch Exchange (PBX) 20 which serves a business premises, for example, is regarded in the architecture of the STN 10 as another SP. The PBX 20 is connected to the trunk side of SP 14 by a voice trunk group 22 which may be, for example, a Basic Rate Interface (BRI) trunk group; a Private Rate Interface (PRI) trunk group or a simple analogue voice trunk group such as a DS0, all of which are well known in the art.

As is well understood, control of the STN 10 is accomplished using a separate signaling network commonly referred to as a Common Channel Signaling (CCS) system. In North America, the common channel signaling system most widely used is Signaling System 7 (SS7). The SS7 protocol provides for call control messaging in which call control messages are transmitted over signaling links between SPs 12, 14. For the sake of efficiency and in order to conserve signaling links, Signaling Transfer Points (STP) 24, 26 are used to link the SPs in an STN. To provide reliability, the STPs are generally arranged in redundant mated pairs 24, 26. Each STP 24, 26 is connected to each SP 12, 14 by a signaling link 28, 30, 32 and 34. The signaling links 28–34 are "A links" as is well understood in the art.

In the system shown in FIG. 1, each signaling link 28–34 is coupled to a signal link monitor (M) 36, 38, 40 and 42 respectively. The monitors 36–42 are available from GN NETTEST of Brøndby, Denmark, and other manufacturers. Each monitor 36–42 is capable of capturing a common channel signaling message at the bit level in real-time and copying any desired message type to a predefined destination. In order to accomplish this, in accordance with this embodiment of the invention the monitors 36–42 are connected by data links 44 to a data network 46. The data network 46 may be a Local Area Network (LAN), a Wide Area Network (WAN) or any other suitable data network. Data links 44 are, for example, Ethernet links which support TCP/IP messaging.

Other components of the system in accordance with the invention include an Answer Supervision Analyzer 48 which is likewise connected to the data network 46 by a data link 50, an Answer Supervision Controller (ASC) 52 is also connected to data network 46 by a data link 54. Another component of the system in accordance with the preferred embodiment of the invention is a Virtual Network Element (VNE) 56. The VNE 56 in this embodiment of the invention is a virtual node in the STN 10 and a physical node in the CCS system of the network. The VNE 56 is therefore connected to the STPs 24, 26 by signaling links 59, 60, which are B or D links, in a manner well known in the art. The VNE 56 is preferably assigned a CCS point code in the network reserved for STPs but may be assigned a Point Code reserved for SPs. The VNE 56 is also connected to the data network 46 by a data link 58 which may be, for example, a TCP/IP or an Ethernet link.

This system in accordance with the invention further includes Voice Path Monitors (VPM) 62, 64 available, for example, from Sentry Telecom of Vancouver, BC, Canada. The VPM 62 is connected to a loop-back trunk group 66 having opposite ends which are connected to the trunk side of SP 14, as will be explained below in more detail. The VPM 64 is connected to the Inter-switch trunk group 18 using a link 71 that includes a Digital Cross-Connect (DAC) and a Test Access Digital Interface (TAD), in a known manner. As will be understood by persons skilled in the art, the VPM 62 may also be connected to the trunk group 18 by a standard high impedance bridge device (not illustrated). The VPM 62 is connected to the data network by data link 68 and the VPM 64 is connected to the data network 46 by data link 70. The function of each of the components of the system in accordance with the invention will be explained below with reference to FIGS. 2, 3 and 4.

As discussed above, it is known that two particular components of the STN 10 are principally responsible for failing to provide answer indication on call completion. Those two components are the PBX 20 and an Interactive Voice Response (IVR) unit 72. The IVR 72 has traditionally been excused from providing an answer indication because it was originally designed as a network element for providing automated call distribution services. The uses of the IVR have grown dramatically in the modern PSTN, and it is now used for a variety of functions including voice mail, facsimile store and forward, and other types of interactive call processing. The use of IVRs represent many thousands of minutes of network resource usage daily and that network resource usage is often unbillable. For example, it is not uncommon practice to add an IVR 73 to the PBX 20. The IVR 73 may be used as a holding dock for calls directed to the PBX 20. If a call is received at the PBX 20 and there is no capacity to handle the call (all agents are busy, for example) the call may be passed to the IVR 73 without providing an answer indication to the network. Only after an agent becomes available to respond to the call and the call is transferred to the agent is an answer indication provided to the network even though network circuits carrying the call may have been occupied for many minutes.

Systems in accordance with the invention support at least two methods of implementing answer supervision in the STN 10. The first method is hereinafter referred to as "non-selective real-time" answer supervision which provides the broadest and most immediate coverage but requires a plurality of VPMs 64 strategically placed in the STN 10 to monitor inter-switch trunks 18.

Figure 2:
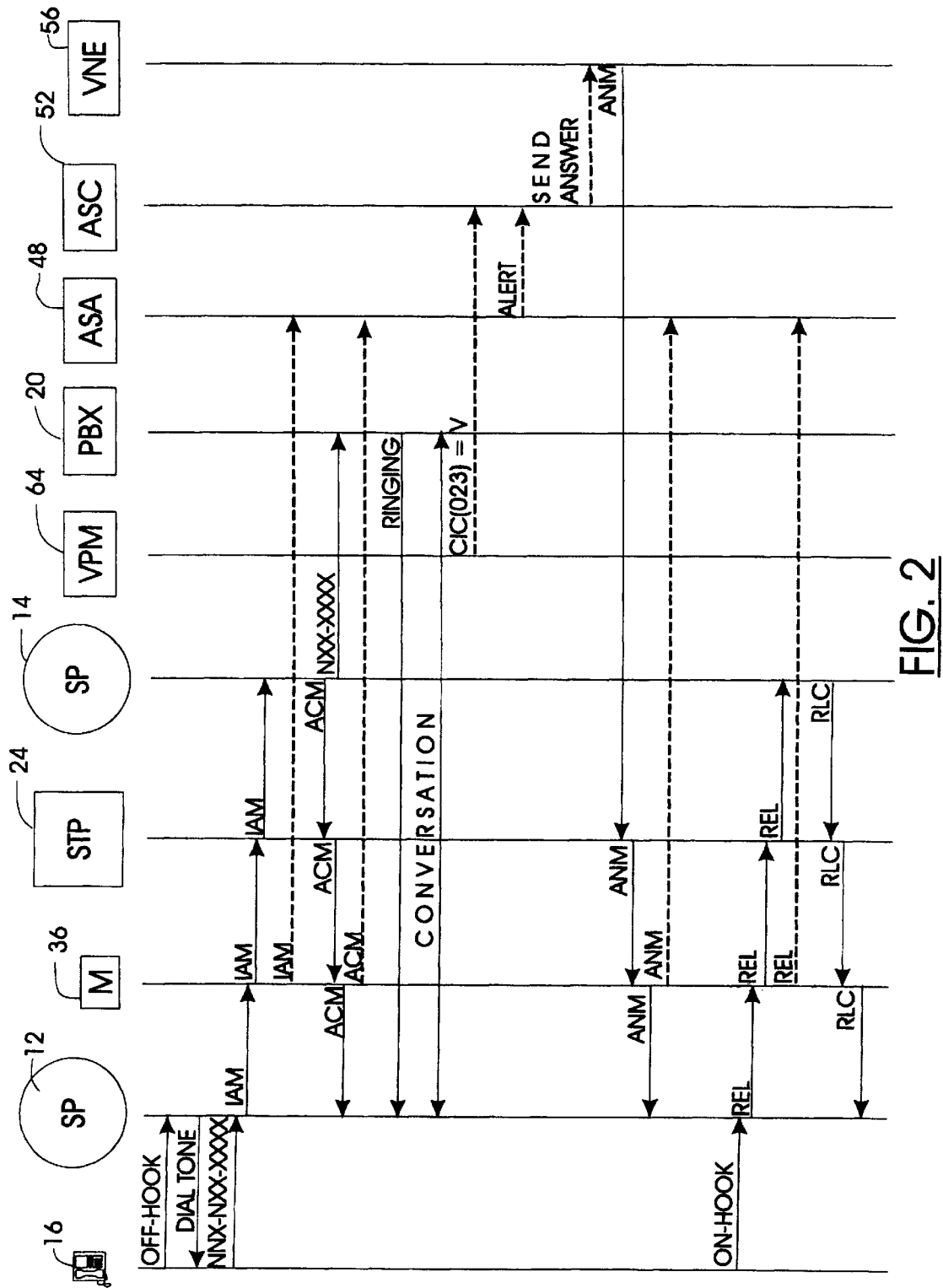
FIG. 2 is a schematic diagram of message flow between elements of the STN equipped with a system in accordance with the invention shown in FIG. 1 in which answer supervision is provided in a non-selective real-time mode of operation.

FIG. 2 shows a simplified schematic diagram of message flow in an exemplary non-selective real-time implementation of the invention. In the example shown in FIG. 2, the subscriber telephone 16 is taken off-hook which sends an off-hook signal to the SP 12 which responds with a dial tone on the subscriber line. The subscriber using telephone 16 dials a long distance number 1-NNX-NXX-XXXX. On receipt of the dialled digits, the SP 12 recognizes the number as a request for a toll call and responds by preparing an Initial Address Message (IAM) in SS7 format. The SP 12 forwards the IAM over signaling link 28 (see FIG. 1) to the STP 24. En route to the STP 24, the IAM passes through the monitor 36 which captures a bit-level copy of the IAM which is stored in a memory of the monitor 36. The STP 24 examines the Destination Point Code (DPC) of the IAM and uses translation tables to determine that the IAM should be forwarded to SP 14. It will be understood by those skilled in the art that there may be other SPs located between SP 12 and SP 14, but for the sake of simplicity of example only these two SPs are shown. In the meantime, the monitor 36 transmits the copy of the IAM over a data link 44 to the data network 46 and on to the ASA 48.

In FIG. 2 and the diagrams which follow, SS7 messages are represented by solid lines and TCP/IP messages are represented by dashed lines. On receipt of the IAM at SP 14, the SP 14 checks the availability of trunk members in trunk group 22 (see FIG. 1) which connects SP 14 with the PBX 20. The SP 14 determines that a trunk member is available for the call being set-up and returns an SS7 Address Complete Message (ACM) to the STP 24, which in turn forwards the ACM to the SP 12, completing the set-up of a voice path for which trunk allocations (not shown) have been made in the process following procedures well known in the art. As the ACM passes through the monitor 36, a bit-level copy is made and the monitor 36 forwards the copy of the ACM over data network 46 to the ASA 48. The ASA 48 is preferably a high-speed computer connected to the data network 46 by a data link 50 as described above.

On receipt of the copy of the IAM from the monitor 36, the ASA 48 wrote an entry in a call trace table (not illustrated) recording the Originating Point Code (OPC), the Destination Point Code (DPC), the Circuit Identification Code (CIC), the called number for the call, a time of receipt of the IAM, and a call status, which is set to "call setup", or the like. On receipt of the ACM, the ASA 48 uses the OPC, DPC and CIC to locate the table entry for the call and updates the call status in the call trace table to "address complete". Meanwhile, the PBX on receiving notification of the call over trunk 22 from the SP 14 applies a ringing signal which is transmitted over the voice path to the subscriber telephone 16. The ringing signal likewise causes a telephone extension 74 (see FIG. 1) to ring. When telephone extension 74 is answered, the PBX 20 turns off the ringing signal but fails to provide an answer indication to SP 14. As will be understood by those skilled in the art, the mechanism for providing an answer indication depends upon the type of facility (voice trunk group 22, FIG. 1) used to connect the PBX 20 to the SP 14. After the PBX 20 ceases the ringing tone, conversation, data transfer or facsimile transfer can occur over the voice path established between the PBX 20 and the subscriber telephone 16 even though the STN 10 is not informed that the call has been answered.

Since an answer indication is not received at SP 12, billing for the call is not initiated. In the meantime, ASA 48 periodically examines each record in the call trace table. During each scan of the call trace table, the ASA 48 examines the status of each call in progress. If the status of a call is "address complete", the ASA 48 uses the time at which the copy of the IAM was received to compute an elapsed time since call setup began. If that elapsed time exceeds a predefined time interval, the ASA 48 formulates an alert message which it forwards to the ASC 52.

It should be understood that although the ASA 48 and the ASC 52 are described and illustrated as separate entities, the functionality of each may be implemented on a single computing platform, or on any number of computing platforms. The important factor is that enough computing resources are preferably available to implement the functionality on a real-time basis.

On receipt of the alert message, the ASC 52 preferably consults a rule base (not illustrated) using the called number to determine whether any prescribed treatment is defined for the called number. The structure and functionality of such a rule base is well understood. It may be used to permit a known network element such as an IVR 72, for example, to function without providing an answer indication. In the example shown in FIG. 2, the called number is not located in the rule base and the ASC 52 is programmed to provide answer supervision by default. The ASC 52 consequently examines a table in its memory that is maintained using TCP/IP messages transmitted over the data network 46 from the VPM 64. The ASC 52 determines that voice payload traffic has been detected on CIC (023) by the VPM 64. The ASC responds by preparing a data message which it forwards over data network 46 to the VNE 56 instructing the VNE 56 to prepare an answer message (ANM) and transmit the ANM to the SP 12. In response to the instruction, the VNE 56 prepares an ANM using a DPC, an OPC and a CIC provided by the ASC 52. The ANM is transmitted over signaling link 59 to STP 24 which forwards the ANM through monitor 36. The monitor 36 copies the ANM and transmits the copy to the ASA 48. On receipt of the ANM, the SP 12 initiates billing for the call. The call is thereafter permitted to terminate in accordance with normal procedures. It should be understood that although in the examples described above and below, the VPM 64 automatically transmits state changes which occur in each voice trunk (e.g. DS0 channel) it monitors, the VPM 64 could also be polled by the ASC 52 to determine on demand the state of any voice trunk being monitored.

In the example shown in FIG. 2, the subscriber telephone 16 is eventually placed on-hook which prompts the SP 12 to send a release (REL) message over signaling link 28 which is bit copied by the monitor 36 as it proceeds to the STP 24. STP 24 forwards the REL message to SP 14 and SP 14 returns a Release Complete (RLC) to STP 24. In the meantime, the monitor 36 forwards the copy of the REL message to the ASA 48. On receipt of the ANM message, the ASA 48 preferably deletes the call record from its call trace table to free resources respecting that call. When the REL message is received, there is no corresponding call record, so the message is simply discarded. It is important, however, that copies of REL messages be routinely forwarded to the ASA 48 so that calls which are released during call setup are deleted from the call trace table, to avoid spurious alert messages for call setups which fail, for example, because the called number is busy. In the meantime, the STP 24 forwards the RLC message through monitor 36. Monitor 36 is preferably programmed to ignore RLC messages and simply deletes RLC messages from its memory. When the SP 12 receives the RLC message, it frees trunk resources allocated to the call.

Selective real-time answer supervision will now be explained with reference to FIGS. 3 and 4. Selective real-time answer supervision begins with a process in which terminating numbers that do not provide answer supervision are identified, and after a number is identified calls to that number are routed over monitored facilities. Adjustments to SP routing tables to route the calls over monitored facilities may be an automated, substantially real-time process or an administrative process in which off-line decisions are made respecting whether calls to a given number should be monitored. The decision-making process may also include a step of determining what treatment, if any, should be applied to called equipment that fails to provide an answer indication.

Figure 3:
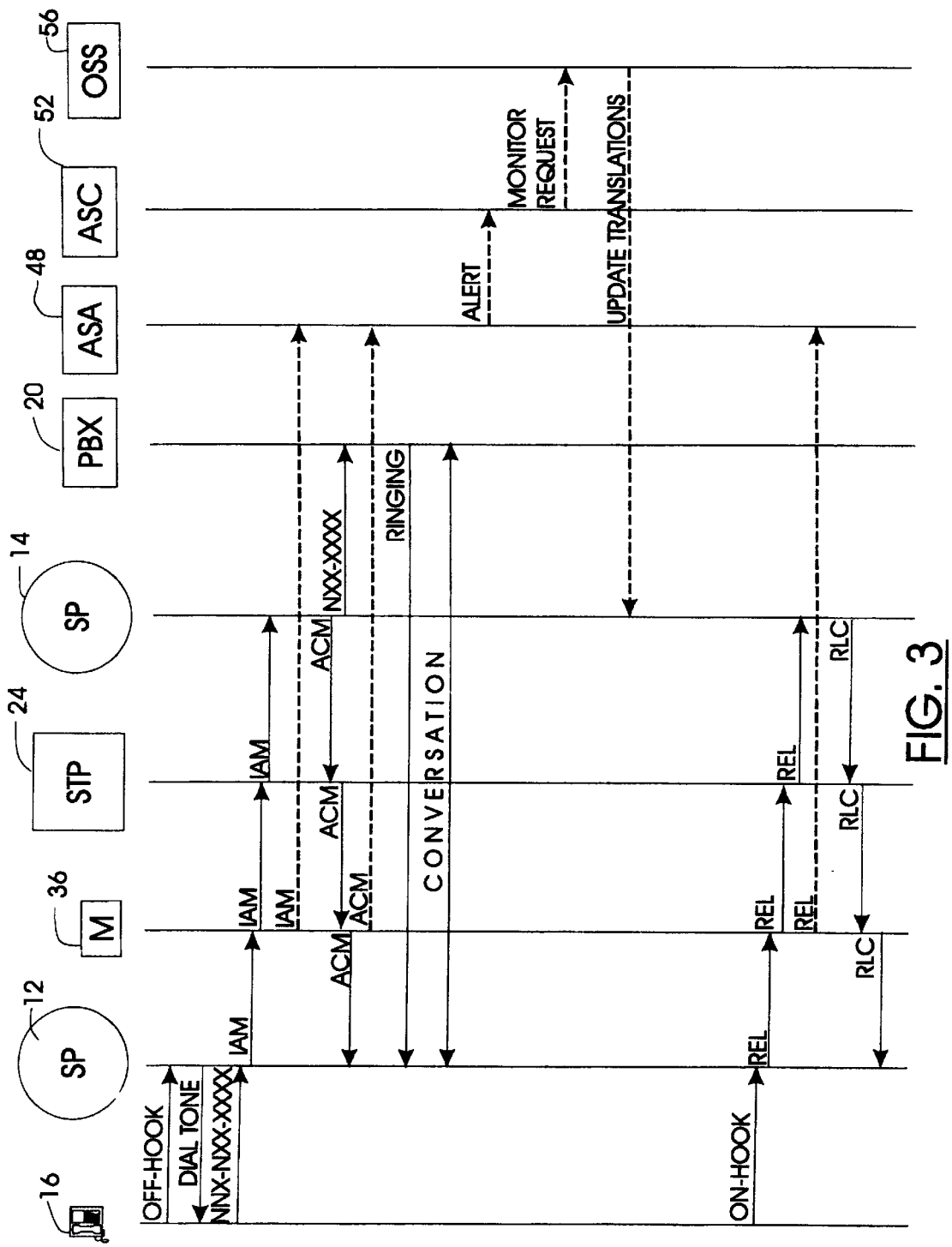
FIG. 3 is a schematic diagram of message flow in a first phase of a process that occurs among elements of an STN in which answer supervision is provided in a selective real-time mode.

In the example shown in FIG. 3, the subscriber telephone 16 is taken off-hook which alerts SP 12 to apply a dial tone to the subscriber's line. The subscriber dials the number 1-NNX-NXX-XXXX which alerts SP 12 that a long distance communication is requested. The SP 12, as described above, formulates an SS7 IAM which is forwarded through the network to the SP 14. Call processing proceeds as described above with the monitor 36 copying the IAM and the ACM messages to the ASA 48. The ASA 48 writes a corresponding call record in its call trace table and periodically examines the record to determine whether an ANM or an REL message has been received. After a preset time interval (typically 2–3 minutes for a large margin of safety), the ASA sends an alert message to ASC 52. The time interval before an alert message is sent to the ASC 52 is preferably an editable variable and is a matter of administrative preference.

On receipt of the alert message, the ASC 52 checks the called number against its rule base to determine whether the called number is a known number for which a call treatment is already prescribed. If the number is not on the monitored list, the ASC may send a monitor request to an Operations Support System (OSS) 76. On receipt, of the monitor request, the OSS 76 may be enabled to automatically update translations in the SP 14 to route future calls to the dialled number (i.e. the number of the PBX 20) over the loop-back trunk group 66 so that future calls to that number can be monitored. Another alternative is that monitor request messages sent to the OSS 76 are routed to an answer supervision administrator who makes a decision based on the called number, or any other available information, as to whether calls to the number should be monitored.

In the example shown in FIG. 3, the OSS 76 is enabled to automatically update translation tables in SP 14. The translation tables are updated, which may be accomplished dynamically or update requests may be entered in an update queue depending on network procedures. Subsequently, the call is permitted to terminate in accordance with normal procedures, which were described above with reference to FIG. 2.

Figure 4:
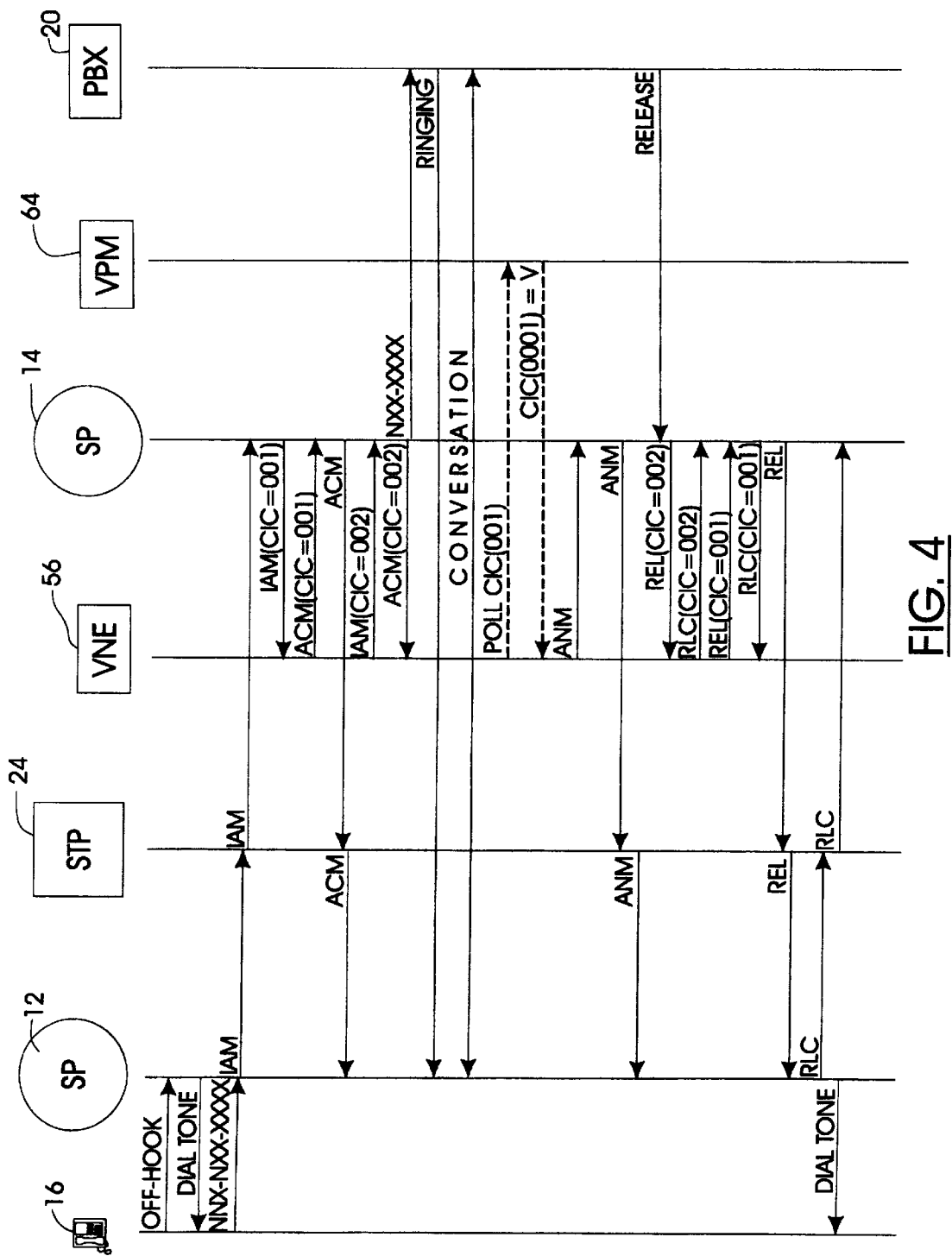
FIG. 4 is a schematic diagram of message flow in a second phase of the process that occurs among elements of an STN in which answer supervision is provided in the selective real-time mode.

A second phase of this selective method of providing answer supervision in a switched telephone network is schematically illustrated in FIG. 4. As described above, all calls to be monitored for answer supervision are routed by modifying translation tables in a manner well known in the art so that incoming calls to the called number (PBX 20) are routed over the loop-back trunk group 66 connected to SP 14. The VNE 56 may be configured as a virtual switching node in the loop-back trunk group 66. If so, all SS7 messages related to calls routed over the loop-back trunk group 66 are sent to the VNE 56. This permits the VNE 56 to control answer supervision for those calls without input from the ASA 48 or the ASC 52, if desired.

In the example shown in FIG. 4, the subscriber telephone 16 is taken off-hook, which alerts the SP 12 to apply a dial tone to the line of subscriber telephone 16. The subscriber at telephone 16 dials the number 1-NNX-NXX-XXXX. This prompts SP 12 to create an IAM which is forwarded to STP 24 over signaling link 28 (see FIG. 1). The STP 24 forwards the IAM to SP 14 over signaling link 32. It will be understood by those skilled in the art that copies of the IAM are captured by the monitors 36, 40 and forwarded to the ASA 48. Neither of these steps are shown for the purposes of clarity. The ASA 48 may be programmed to consult a table of monitored numbers (not shown) and discard the messages if the called number appears in the table, or may be programmed to log the messages in its call trace table as described above.

Referring again to FIG. 4, on receipt of the IAM, SP 14 consults its translation tables and determines that inbound calls for the number NXX-XXXX are to be routed to the loop-back trunk group 66. A link set associated with the loop-back trunk group 66 routes CCS signaling messages to the point code of VNE 56. The SP 14 therefore formulates an IAM which is forwarded to the VNE 56. On receipt of the IAM, the VNE 56 preferably creates a Call Trace Record (CTR) which details information in the IAM such as call originating number, called number, OPC, DPC, CIC, and time of receipt, for example. The VNE 56 then modifies the IAM by transposing the OPC and the DPC. The CIC must also be modified to indicate an opposite end of the member of the loop-back trunk group 66 seized by SP 14 before sending the IAM to the VNE 56. This is most readily accomplished by sequentially numbering opposite ends of each member of the loop-back trunk group 66. If the loop-back trunk group 66 is thus provisioned, the VNE 56 simply increments the CIC by one and returns the IAM to the SP 14. This causes the SP 14 to seize an opposite end of the trunk member in loop-back trunk group 66, which completes a voice circuit over a member in the loop-back trunk group 66.

On receipt of the IAM from VNE 56, SP 14 examines the trunk group 22 which connects the PBX 20 to the SP 14 and determines that it has capacity to accept the call. Notice of the call is therefore forwarded to the PBX 20 and an ACM message is returned to the VNE 56. The VNE 56 records the ACM in its CTR, transposes the point codes and the CIC as described above and returns the ACM message to the SP 14. SP 14 formulates a corresponding ACM which is forwarded to the STP 24 and the STP 24 forwards the ACM to the SP 12. Once again, it will be apparent to those skilled in the art that copies of the ACM are captured by the Monitors 40, 36 and forwarded to the ASA 48. It will also be apparent that messages from VNE 56 to SP 14, and vice versa, pass through STP 24, although this is not illustrated for clarity.

On receipt of the ACM at the SP 12, the voice circuit allocation is complete. Ringing applied to an extension 78 (FIG. 1) at PBX 20 travels back over the voice circuit to the subscriber telephone 16.

When the extension 78 is answered, the PBX 20 terminates the ringing signal but does not supply an answer indication back to SP 14. Consequently, payload traffic can ensue. In the meantime, VNE 56 is programmed to take one of two actions. The VNE 56 either waits a predetermined period of time, say 20 seconds, or immediately begins polling the VPM 62 to determine whether payload traffic has commenced on the member of the loop-back trunk 66 being used for the call connection. In this example, the query sent to VPM 62 returns a response that the CIC identifies a trunk member on which voice traffic has been detected. On receipt of the response, the VNE 56 formulates an ANM using data from the CTR and sends the ANM to the SP 14. The SP 14 responds to receipt of the ANM from VNE 56 by sending an ANM back to the SP 12 via STP 24 which initiates billing for the call. When the call is terminated, the extension phone 78 (FIG. 1), for example, is placed on-hook and the PBX 20 advises the SP 14 of the release. In response, the SP 14 formulates an REL message to the VNE 56. The VNE 56 responds immediately with an RLC. The VNE 56 then updates its CTR to indicate call termination and formulates an REL message for the opposite end of the trunk member in loop-back trunk group 66. The VNE 56 then forwards the REL (CIC=001) to the SP 14 which responds with an RLC. The SP 14 formulates an REL message which is sent to STP 24. The STP 24 forwards the REL message to SP 12 which returns an RLC message to the SP 14 in a manner well known in the art. Thereafter, if subscriber phone 16 is not yet on-hook, a dial tone is applied to that line.

As will be understood by those skilled in the art, each of the ANM, REL and RLC messages sent over signaling links 28, 32 are copied by monitors 36, 42 to the ASA 48. As described above, the ASA 48 may discard the messages or may update its call trace table as described above. Since the ASA 48 receives an ANM message for the call, the call trace record is deleted and no alert message is sent to ASC 52.

It should also be understood that although FIG. 4 shows that the VNE 56 polls the VPM 64 to obtain trunk status information, the VPM 64 could be programmed to automatically update a trunk status table in the memory of VNE 56 each time a trunk state change is detected. It should be further understood that the VNE 56 could be equipped with payload detection algorithms and connected to the loop-back trunk group 66 by a high impedance bridge, or the like, so that it directly monitors state changes in the trunks of trunk group 66.

Figure 5:
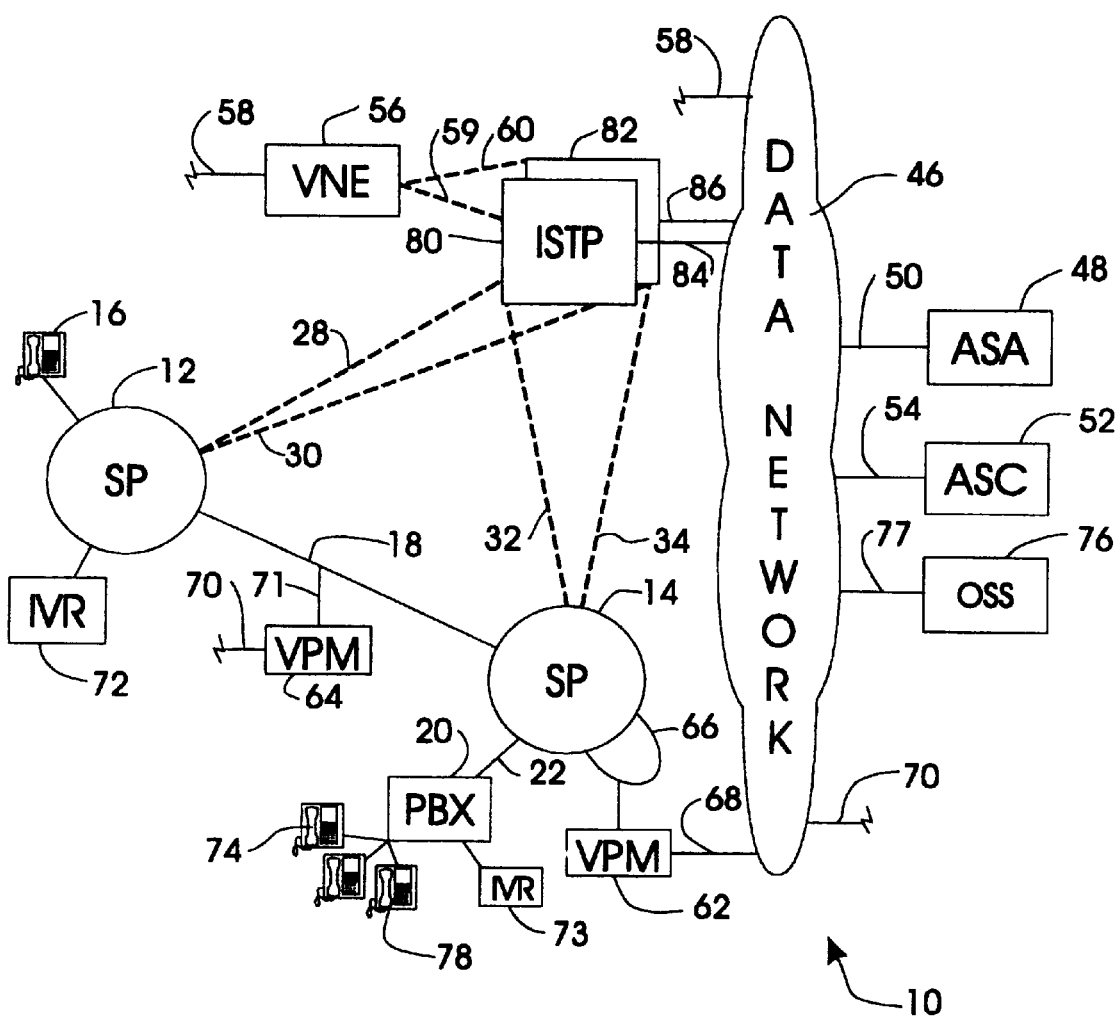
FIG. 5 is a schematic diagram of a small portion of a switched telephone network showing an alternate arrangement of apparatus for a system in accordance with the invention.

FIG. 5 shows another simplified diagram of a small portion of an STN 10 equipped to practice the methods in accordance with the invention. The network configuration shown in FIG. 5 is identical to that shown in FIG. 1 with the exception that the monitors 36–42 are replaced by a mated pair of Intelligent Signal Transfer Points (ISTP) 80, 82. The ISTPs are described in U.S. Pat. No. 5,586,177 which issued Dec. 17, 1996 to Farris et al, the specification of which is incorporated herein by reference. The function and operation of the system schematically illustrated in FIG. 5 is substantially the same as described above with reference to FIGS. 1–4 with the exception that the copying of call control CCS messages is accomplished by the ISTPs 80, 82 rather than the Monitors 36–42. The ISTPs 80, 82 are connected to the data network 46 using, for example, an Ethernet connection over which TCP/IP messages are sent to the ASA 48. Answer supervision may be implemented using the non-selective real-time method or the selective real-time method and call flows are substantially identical to those described with reference to FIGS. 2–4. A repetition of the description of those call flows is therefore not repeated.

Figure 6:
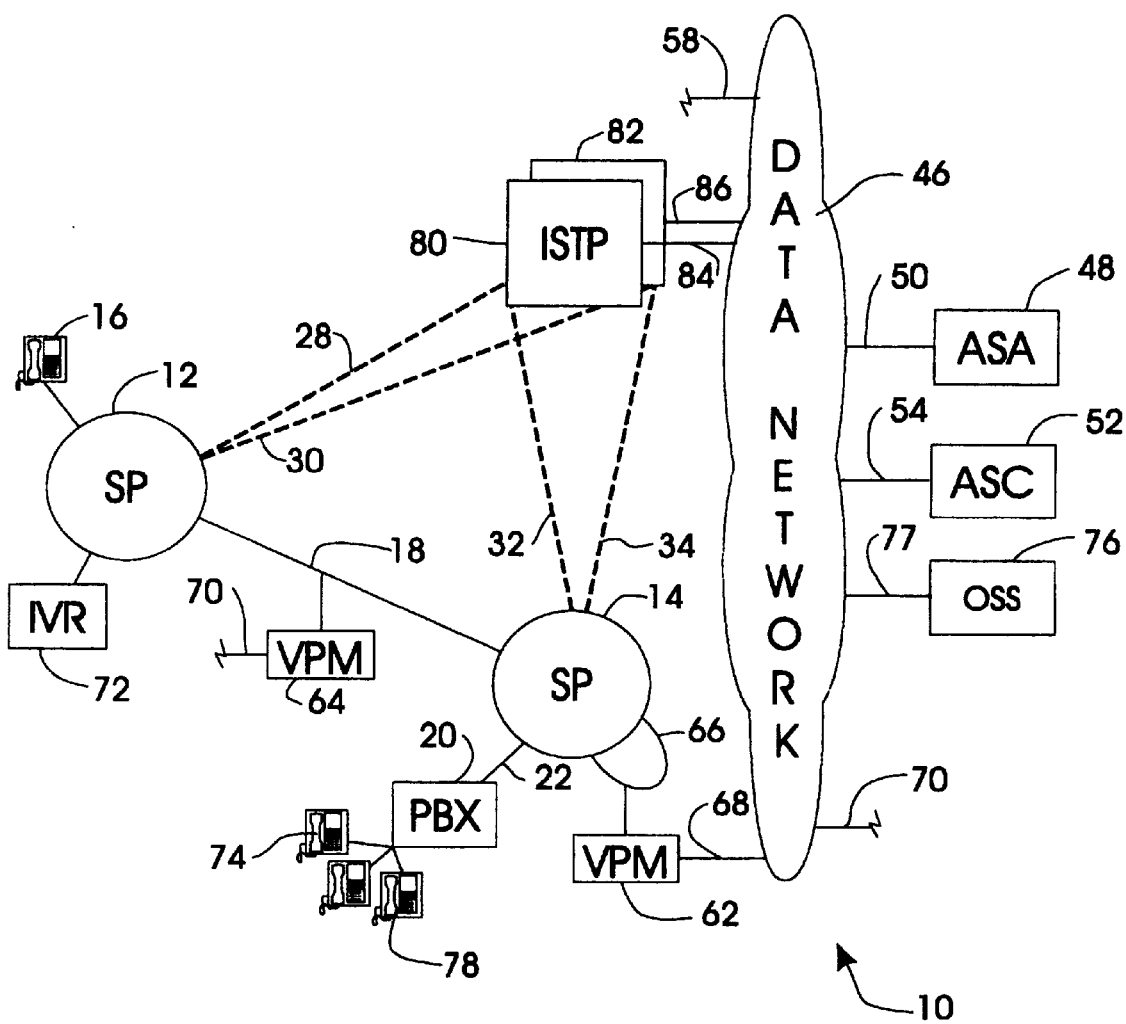
FIG. 6 is a schematic diagram of the same portion of a switched telephone network showing yet a further arrangement of apparatus for a system in accordance with the invention.

FIG. 6 shows yet a further potential configuration for a small portion of the STN 10 to provide a system for practising the method in accordance with the invention. In the system shown in FIG. 6, the functions of both Monitors 36–42 and the VNE 56 are handled by the ISTP pair 80, 82, assuming that the ISTP pair 80, 82 has adequate capacity to perform the functions of both the Monitors 36–42 and the VNE 56. In other respects, the system shown in FIG. 6 is identical to the system shown in FIGS. 1 and 5. As noted above, the ISTPs 80, 82 are connected to the data network 46 by data links 84 and 86 respectively. This permits the ISTPs 80, 82 to send data messages to the ASA 48 and receive data messages from the ASC 52. The ISTPs 80, 82 configured as shown in FIG. 6 may be enabled to practice answer supervision in the non-selective real-time mode or the selective real-time mode.

Figure 7:
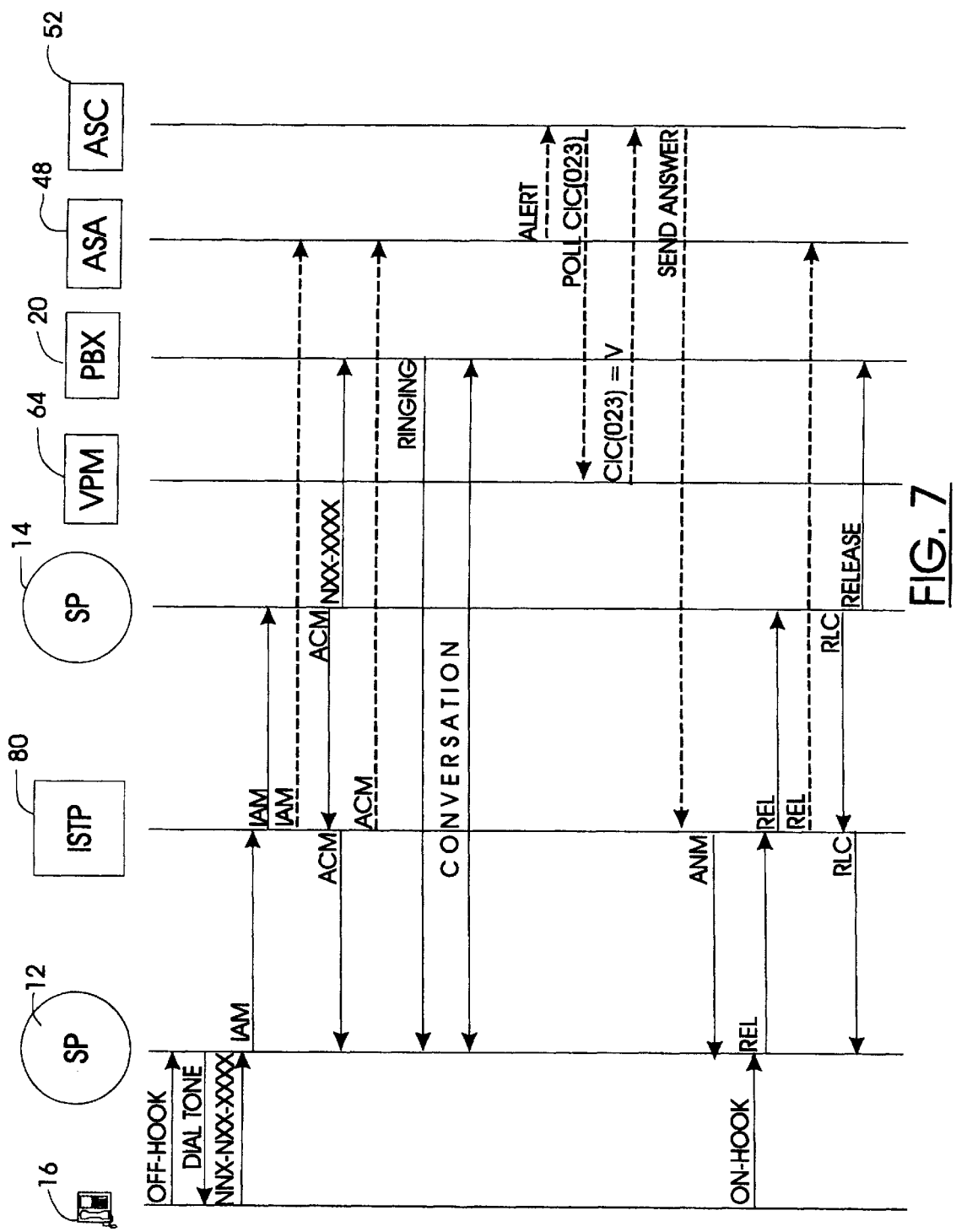
FIG. 7 is a schematic diagram of message flow between elements of an STN equipped with a system in accordance with the invention shown in FIG. 6 in which answer supervision is provided in a non-selective real-time mode.

FIG. 7 is a simplified schematic diagram of a call flow in which the ISTP 80 practices non-selective real-time answer supervision in the STN 10. In this example, the subscriber telephone 16 is taken off-hook, which sends a signal to the SP 12. The SP 12 returns a dial tone on the subscriber line of subscriber telephone 16. The subscriber dials 1-NNX-NXX-XXXX and the SP 12 responds by formulating an IAM which is forwarded over signaling link 28 (see FIG. 6) to the ISTP 80. The ISTP 80 forwards the IAM to SP 14 after copying the IAM. The ISTP 80 then forwards a copy of the IAM over the data link 84 to the ASA 48. On receipt of the IAM, the ASA uses the call data to create a record in its call trace table, as described above with reference to FIG. 2.

Meanwhile, on receipt of the IAM, the SP 14 checks for the availability of a trunk member in trunk group 22 and determines that a trunk member is available. The SP 14 therefore returns an ACM message which is received by ISTP 80 and forwarded to SP 12. The ISTP 80 copies the ACM message to the ASA 48. Meanwhile, the SP 14 has alerted PBX 20 of the incoming call and the PBX 20 applies ringing to the extension phone 74, for example, and the ringing is transmitted back over the reserved voice path (not shown) to the subscriber telephone 16. When the telephone at extension 74 is answered, the PBX 20 stops the ringing signal but does not pass an answer indication back to the SP 14. Conversation therefore ensues.

In this example, ASA 48 waits for a ANM message for a default time interval (say 20 seconds) and if the ANM message is not received in that time interval, an alert is sent to ASC 52. The ASC 52 on receipt of the alert checks its rule base to determine how calls to the called number are to be treated. In this example, it is assumed that the number is not found in the rule base and the default treatment is to apply answer supervision on detection of payload traffic on the call path. The ASC therefore extracts information from the alert message to determine the circuit (CIC (023)) in the voice path which should be monitored for payload traffic. Translation tables are used for this purpose. The translation tables provide the ASC 52 with the address of a VPM which should be polled for payload traffic detection. In this example, the address of the VPM 64 is located in the translation tables. The ASC 52 therefore polls the VPM 64 to determine the status of CIC (023), the circuit used in the inter-switch trunk group 18 (FIG. 6) to complete the call. In this example, the VPM 64 returns a status for CIC (021) of "V" indicating that voice traffic has been detected on that circuit. ASC 52 therefore formulates a data message which it transmits over data link 54 through data network 46 to the ISTP 80 requesting that the ISTP 80 send an ANM message to the SP 12. The data message includes all the call data required by the ISTP 80 to formulate an ANM message for the call. On receipt of the data message, the ISTP 80 formulates the ANM which it forwards to SP 12. When SP 12 receives the ANM, it initiates billing for the call. The call is thereafter permitted to proceed until one party goes on-hook and a release sequence is generated in a manner well known in the art and described above in some detail. A copy of the REL message may be forwarded by ISTP 80 to the ASA 48 to permit the ASA 48 to delete its call trace record. Alternatively, the ASA 48 may be programmed to delete its call trace record after it sends the alert to the ASC 52. The procedure used is a matter of design choice.

Although FIG. 7 shows that the VPM 64 is polled by the ASC 52 to determine the state of a given trunk, it should be understood that VPM 64 may be enabled to automatically update the ASC 52 each time a state change is detected in a trunk it monitors. In that case, ASC 52 would merely consult a table in its memory maintained by VPM 64 to determine the state of CIC (023) on receipt of the alert message from ASA 48. Those skilled in the art will realize that these variations in implementation are matters of design choice.

Figure 8:
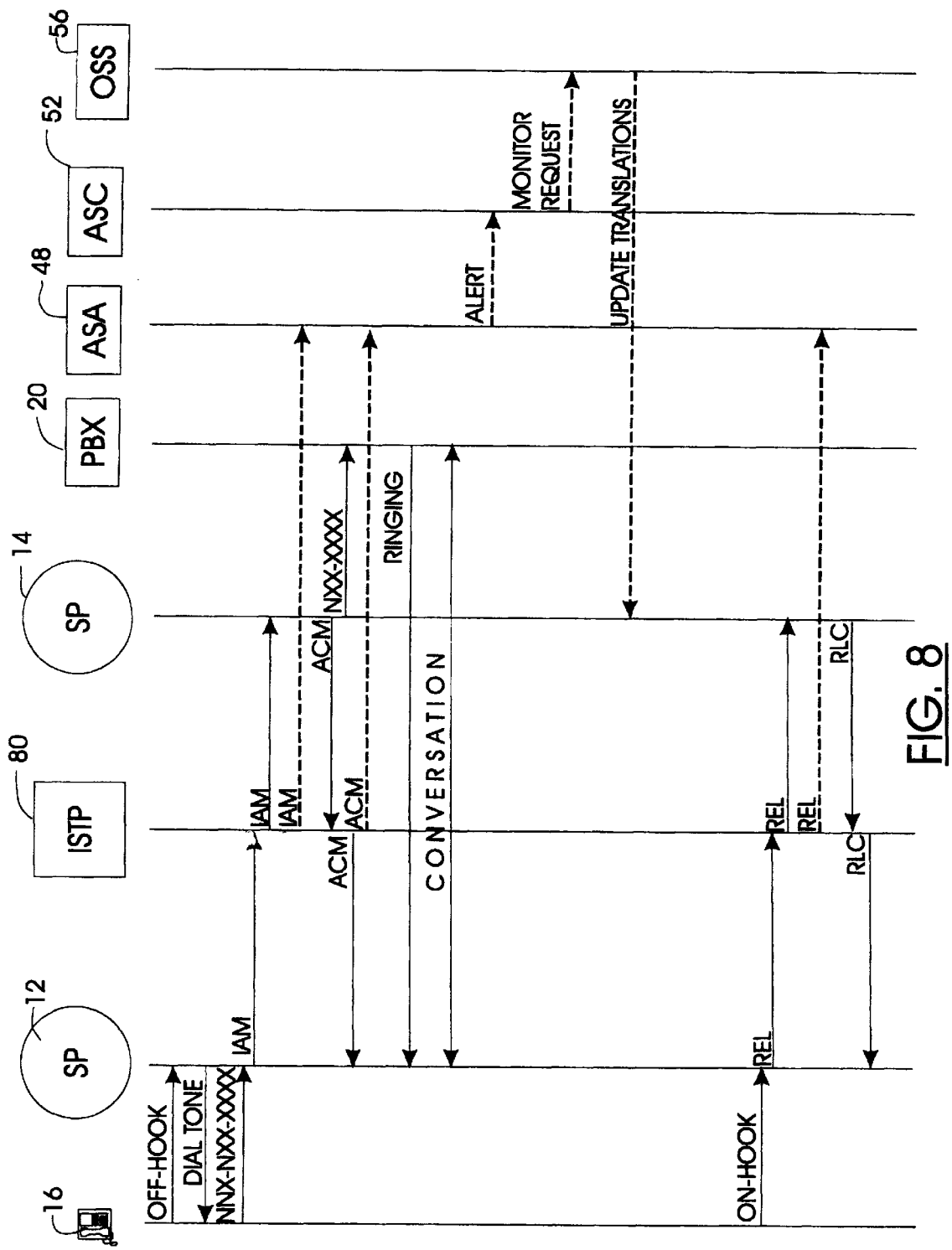
FIG. 8 is a schematic diagram of message flow in a first phase of a process that occurs among elements of an STN in which answer supervision is provided in a selective real-time mode.
Figure 9:
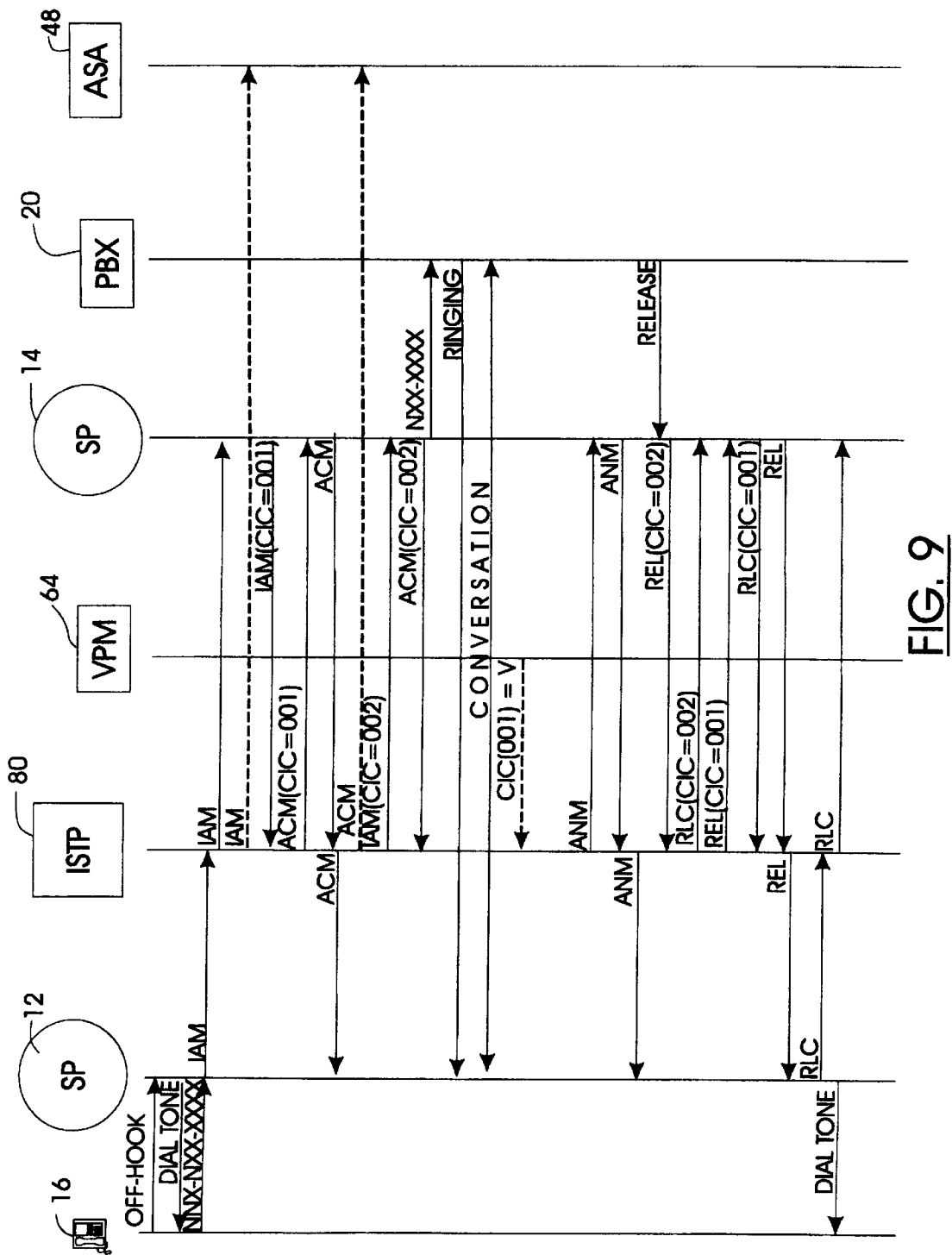
FIG. 9 is a schematic diagram of message flow in a second phase of the process that occurs among elements of an STN in which answer supervision is provided in the selective real-time mode.

FIGS. 8 and 9 schematically illustrate the method of selective real-time answer supervision as practised with the configuration of the system in accordance with the invention illustrated in FIG. 6. In the first phase of selective real-time answer supervision shown in FIG. 8, the subscriber telephone 16 is taken off-hook which prompts the SP 12 to apply a dial tone to the subscriber's line. The subscriber responds by dialling 1-NNX-NXX-XXXX. This prompts SP 12 to seize an outbound idle trunk member of trunk group 18 (FIG. 6) and formulate an IAM which is forwarded to ISTP 80 over signal link 28. On receipt of the IAM, the ISTP 80 forwards the IAM to SP 14 after it has copied the IAM. The copy of the IAM is forwarded by ISTP 80 to the ASA 48 via data network 46. Meanwhile, SP 14 has checked trunk group 22 for an idle trunk member to PBX 20 and on locating an idle trunk member, returns an ACM to SP 12. The ACM is received by ISTP 80, copied and forwarded to SP 12. The copy of the ACM is sent by the ISTP 80 to the ASA 48. Meanwhile, PBX 20 has applied a ringing signal to the extension telephone 78 and the ringing signal is transmitted back over the reserved voice path (not shown) to the subscriber telephone 16. When the telephone extension 78 is answered, the PBX 20 cancels the ringing signal but fails to pass an answer indication back to the SP 14. Consequently, conversation ensues between the subscriber at telephone 16 and a called party at the extension 78 of PBX 20.

The ASA 48 periodically scans its call trace table to verify the status of calls in progress. In this example, it determines that neither an ANM nor an REL message has been received respecting the call in progress and a default time interval (1 minute, for example) has expired. ASA 48 therefore formulates an alert message which it sends to ASC 52 through the data network 46. On receipt of the alert message, the ASC 52 check its rule base to determine how calls to the dialled number are to be treated. In this example it is assumed that the dialled number is found in the rule base. The defined action associated with the number causes the ASC 52 to formulate a data message which it forwards to the OSS 76 through the data network 46, requesting that calls to the called number be monitored. On receipt of the data message, the OSS 76 updates translation tables in the SP 14 so that future inbound calls to the dialled number are routed over loop-back trunk group 66 to permit the calls to be monitored.

The call is allowed to progress as normal even though revenues for the call are lost. It should be understood by those skilled in the art that the ASC 52 could likewise be programmed to cancel the call on receipt of the alert by instructing the ISTP 80 to send an REL message (not illustrated) to both SPs 12 and 14 rather than permitting the call to terminate in a normal way. This action may be dictated in the rule base in ASC 52. Other options may also be enabled using the rule base. On call completion, the ISTP 80 may send a copy of the REL message to the ASA 48 to permit the ASA 48 to purge the call trace record from its call trace table. As described above, the ASA 48 may alternatively be programmed to delete a call trace record after an alert is sent to the ASC 52, or an ANM message is received for a call in progress.

FIG. 9 is a simplified schematic representation of the second phase of selective real-time answer supervision as practised with the system shown in FIG. 6. In this example, subscriber telephone 16 is taken off-hook which prompts SP 12 to apply a dial tone to the subscriber's line. The subscriber dials the number 1-NNX-NXX-XXXX which prompts SP 12 to formulate an IAM that is forwarded over the signal link 28 to the ISTP 80. The ISTP 80 copies the IAM and forwards it to the SP 14 over signal link 32. ISTP 80 then sends the copy of the IAM to the ASA 48 via the data network 46. On receipt of the copy, the ASA 48 is preferably programmed to check a monitored number list, where it determines that the IAM relates to a called number which is a monitored number. The ASA 48 therefore discards the copy of the IAM and does not create a call trace record in its call trace table.

Meanwhile, on receipt of the IAM at the SP 14, the updated translation tables in the SP 14 route the call to an outbound end of a trunk member of the loop-back trunk group 66. Consequently, the SP 14 formulates an IAM having a DPC equal to the point code of ISTP 80 and a CIC having a value equal to the first available outbound trunk member, for example, 001. The IAM is forwarded to the ISTP 80 which receives the IAM. The ISTP 80 recognizes the DPC as its own point code and therefore does not copy the message. Rather, the ISTP 80 responds with an ACM message indicating that CIC 001 is available, and returns the ACM with CIC=001 to the SP 14. The SP 14 responds by formulating an ACM that it addresses to the DPC of SP 12 and transmits to the ISTP 80. The ISTP 80 forwards the ACM to the SP 12. The ISTP 80 then formulates an IAM using information from the IAM received from SP 14 by transposing the DPC with the OPC and incrementing the CIC by one. That IAM message is sent to the SP 14, which causes the SP 14 to seize the inbound end of the trunk member of loop-back trunk group 66. This completes a voice circuit over the loop-back trunk. On seizure of the inbound end of the loop-back trunk member, translation tables direct the SP 14 to the trunk group 22 which connects with PBX 20. The SP 14 determines that a trunk member is idle in that trunk group and dispatches an ACM back to ISTP 80 with a CIC=002. In response, the ISTP 80 simply discards the ACM with the CIC=002. Meanwhile, the SP 14 has notified the PBX 20 of the incoming call. The PBX 20 responds by applying a ringing signal to the telephone extension 74 and the ringing signal travels back over the reserved voice path (not shown) to the subscriber telephone 16.

Because the ISTP 80 is programmed to trace all calls routed over the loop-back trunk group 66, it periodically scans a call state table that it maintains for those calls using data respecting trunk state changes in the loop-back trunk group 66 provided to it by the VPM 64. In this example, the VPM 64 has indicated a trunk state change of CIC (001)= "V", indicating that voice payload traffic has been detected on the CIC (001). The ISTP 80 therefore formulates an ANM message which it transmits to the SP 14 and SP 14 formulates a corresponding ANM message which it forwards to the SP 12. That initiates billing for the toll call. The call is permitted to terminate in a normal way in accordance with procedures well known in the art and described above. In this example, ISTP 80 does not forward copies of the REL messages to the ASA 48 because they are associated with monitored calls.

Figure 10:
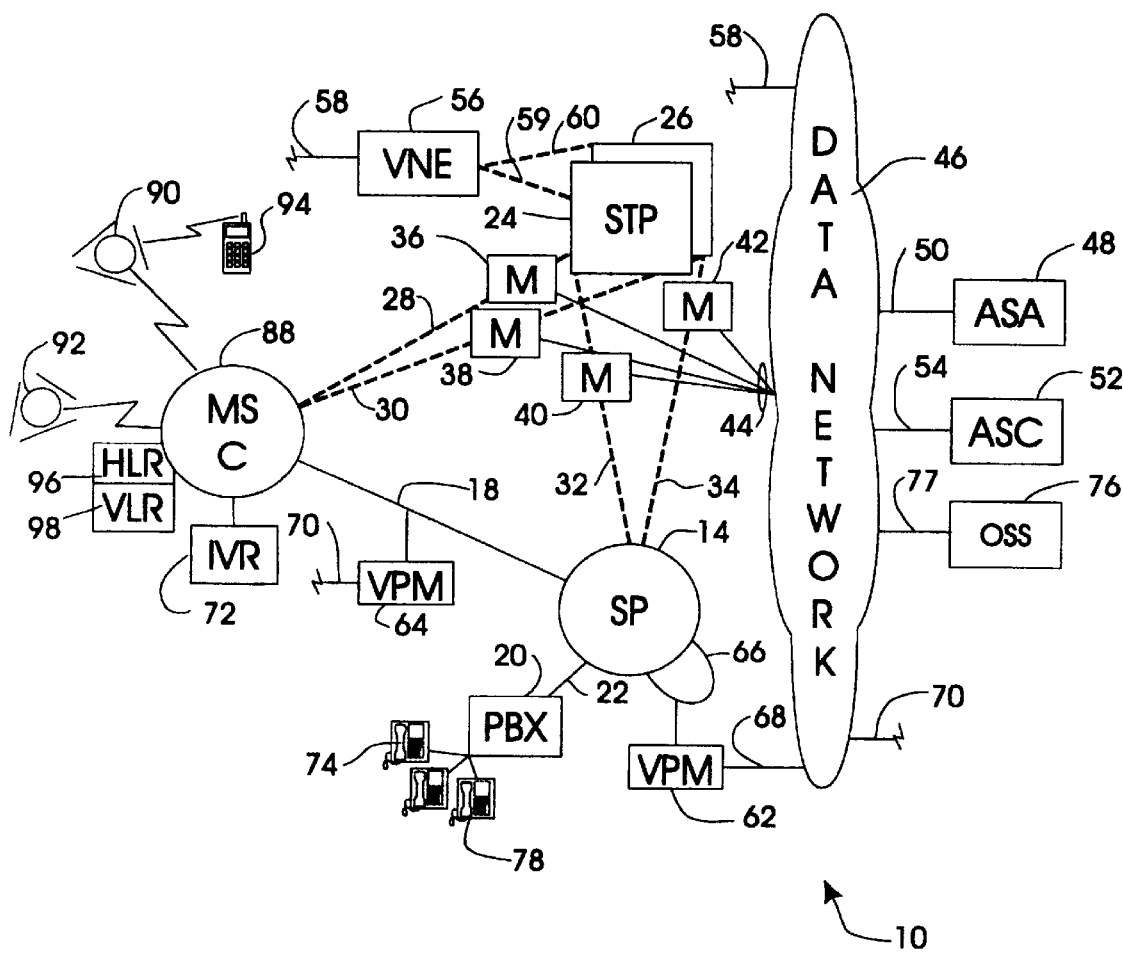
FIG. 10 is a schematic diagram of a small portion of a switched telephone network including wireless facilities to show how the system in accordance with the invention can be used to provide answer supervision for wireless to land-based call connections.

FIG. 10 shows a configuration of an STN which includes a mobile switching center (MSC) 88 connected to a pair of radio base stations 90, 92 that serve a with wireless telephone 94. As is well known in the art, the MSC 88 includes a Home Location Register (HLR) 96 and a Visitor Location Register (VLR) 98. The purposes of the HLR 96 and VLR 98 are well understood in the art and will not be explained. All other elements of the STN 10 are identical to those described with reference to FIG. 1 and the functions are the same. The purpose of the illustration in FIG. 10 is to show that answer supervision in accordance with the invention is effective with wireless to land-based connections.

As will be appreciated by those skilled in the art, answer supervision is rigidly enforced in wireless to wireless communications and is therefore not a problem that needs to be addressed by the methods or systems in accordance with the invention. In wireless to land-based communications, however, a terminating number may not provide an answer indication. It should be understood, however, that calls switched by the mobile switching center 88 to the PBX 20 at SP 14, for example, are handled identically to calls described above with reference to FIGS. 1–4 and answer supervision may be identically applied to eliminate fraud or revenue loss as a result.

Figure 11:
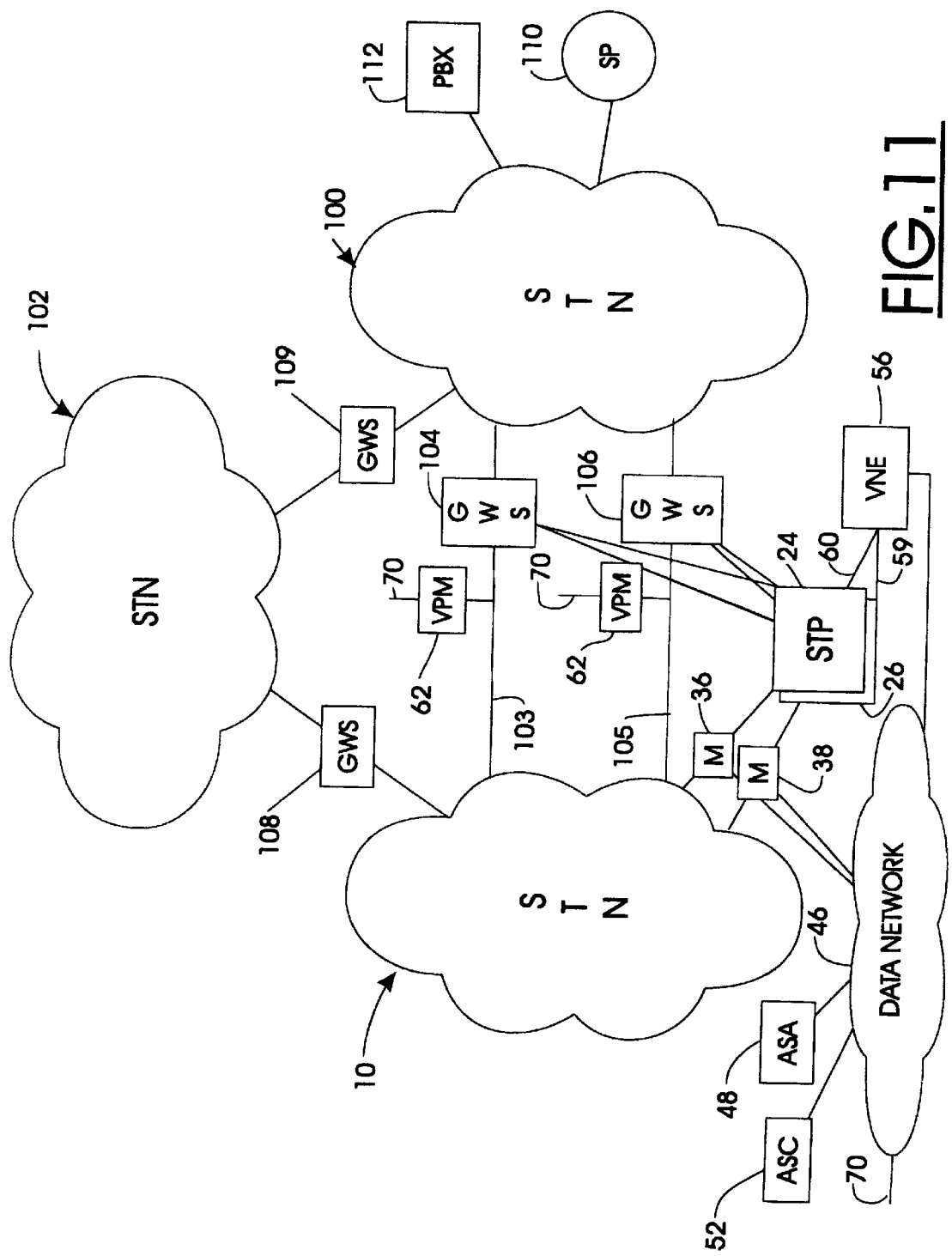
FIG. 11 is another schematic diagram showing an arrangement of apparatus for providing answer supervision between switched telephone networks in the PSTN.

FIG. 11 schematically illustrates a relationship between an STN 10 and neighbouring STNs 100, 102 in the PSTN. The STNs 10, 100, 102 are bridged by gateways switches 104, 106, 108, 109. The gateway switches may be located at international borders. Gateway switches located at international borders are typically operated by third party service providers. Those service providers normally charge for all minutes switched through their gateway switches, regardless of whether calls switched through their gateway switches provide or receive answer indications. As a result, it is not unusual for a switched telephone network to pay gateway switch service fees on calls for which they receive neither direct nor settlement revenue. This loss may result from calls originating in the STN 10 or originating in STN 102 and switched through the STN 10 to STN 100, or vice versa. Bridges between the STN 10 and the STN 100 are provided by trunk groups 103, 105. Only two trunk groups are illustrated for the sake of clarity. There may be tens or dozens of such trunk groups. Nonetheless, it is possible and in most instances practical, to monitor each trunk member of each trunk group in order to ensure answer supervision for all calls which pass through the gateway switches 104, 106.

In this example, CCS control messages are routed through the mated STP pair 24, 26. The signal links are monitored by a pair of monitors 36, 38 which are connected to the data network 46. A VNE 56 is connected by signaling links 59, 60 to the STP pair 24, 26. In this configuration of the system, the VNE 56 is a virtual switching point only to the extent that is enabled to create and transmit common channel signaling messages. It is not a part of the signaling path of the trunk groups 103, 105 and does not receive CCS messages respecting calls switched through the gateway switches 104, 106, as will be explained below in more detail. Copies of all CCS messages generated by the monitors 36, 38 are received by the ASA 48 which analyzes the messages and sends alerts to the ASC 52. The ASC 52 provides instructions to the VNE 56 by messages sent through the data network 46 as will be explained below with reference to FIG. 12.

It should be understood that the function of the monitors 36, 38 could be performed by ISTPs if the mated STP pair 24, 26 were replaced by a mated ISTP pair as explained above with reference to FIG. 5. Likewise, the ISTPs could also perform the functions of the VNE 56, as explained above with reference to FIG. 6, if the ISTPs have the computing capacity required.

Figure 12:
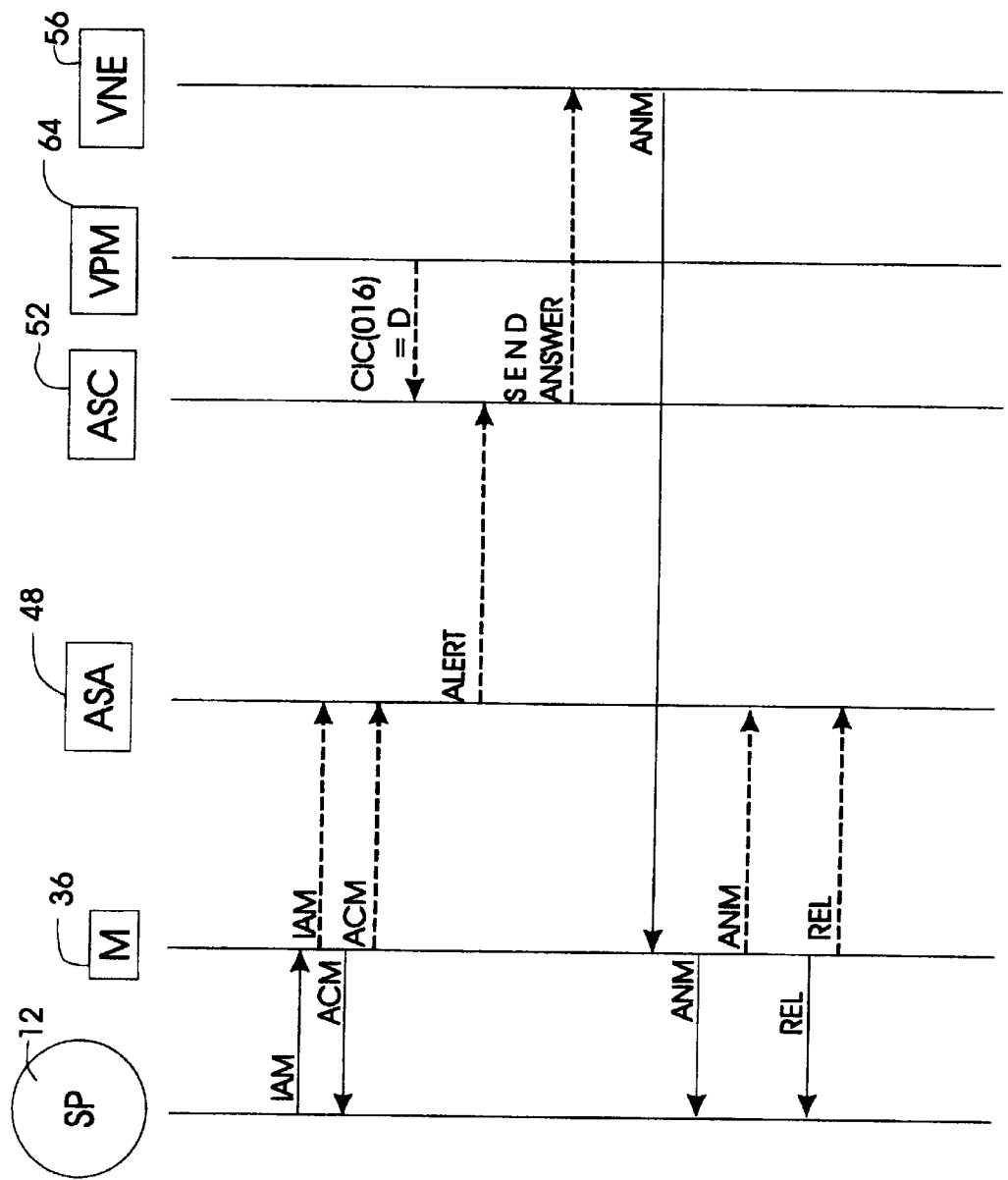
FIG. 12 is a simplified schematic diagram of a message flow among elements of a gateway between two STNs in the PSTN for providing answer supervision for calls flowing through the gateway shown in FIG. 11.

FIG. 12 is a simplified schematic illustration of an answer supervision process in accordance with the configuration of the system shown in FIG. 11. Only components directly involved in the practice of the method in accordance with the invention are illustrated.

In this example, an IAM is dispatched from SP 12 (FIG. 1) to the gateway switch 104 (FIG. 11). The IAM passes through monitor 36 which copies the IAM at the bit level as it is forwarded to the STP 24 (FIG. 11). The copy of the IAM is transmitted by the monitor 36 to the ASA 48 which creates a call trace record for the call in its call trace table. The gateway switch 104 returns an ACM to the STP 24 which forwards the ACM to the SP 12. The monitor 36 copies the ACM forwarded to the SP 12 and sends the copy of the ACM to the ASA 48. In this example, the ASA 48 is programmed to send an alert to the ASC 52 if an ANM for the call is not received within a relatively short period of time (15 seconds, for example). On receipt of the alert, the ASC 52 uses information in the alert message to locate an entry in a trunk state table (not shown) maintained using trunk state data supplied by the VPM 62 connected to the trunk group 103, to determine the status of CIC(016). If the table does not indicate payload traffic, the ASC 52 continues to check the table at periodic intervals (1 second intervals, for example) until the trunk state indicates payload traffic, or the ASA 48 advises that the call has been released. In this example, the trunk state table indicates that payload traffic in the form of a data transmission has been detected on the trunk member having a CIC=016. The ASC 52 responds by sending an instructing message to VNE 56 to formulate an ANM message which is sent through the CCS network to SP 12 to initiate billing for the call. The instructing message includes the data required to formulate the ANM message such as the DPC, OPC, CIC and called number obtained from the copy of the IAM forwarded by the monitor 36 to the ASA 48. As will be understood by those skilled in the art, the DPC and OPC are transposed in the ANM message formulated by the VNE 56. The VNE 56 sends the ANM message in the call originating direction. The ANM message is updated by intervening switches (not shown) as it is propagated through the STN 10 until it is received by the SP 12. The ANM message causes billing for the call to be initiated. The remainder of the call process proceeds as normal and on receipt of the an REL message, the ASA 48 deletes or archives the call trace record from its call trace table. Those skilled in the art will understand that this process works equally well for calls entering the STN 10 from the STN 100 or traversing the STN 10 from the STN 100 to STN 102, or vice versa.

The methods and system in accordance with the invention therefore provide a powerful and effective tool for minimizing revenue losses due to equipment which fails to provide an answer indication either by oversight or design.

The embodiments described above are intended to be exemplary only and are not to be construed in a limiting sense. The scope of the invention is therefore intended to be limited solely by the scope of the appended claims.

I claim:

1. A method of providing answer supervision for calls in a switched telephone network, comprising the steps of:

monitoring common channel signaling links using a signaling link monitor to detect call set-up messages exchanged over a common channel signaling system of the switched telephone network to determine whether a call answer message is sent from a terminating end of the call before a predetermined criteria respecting the call is satisfied; and generating at least one common channel signaling message to control the call in an instance when the call answer message is not received before the predetermined criteria respecting the call is satisfied.

2. A method of providing answer supervision in a switched telephone network as claimed in claim 1 wherein the predetermined criteria respecting the call comprises the elapse of a predetermined time interval after receipt of an Address Complete (ACM) message indicating that the called party phone is available to receive the call.

3. A method of providing answer supervision in a switched telephone network as claimed in claim 1 wherein the predetermined criteria respecting the call comprises the detection of payload traffic on a trunk in a call path between a calling party and the terminating end of the call after receipt of an Address Complete (ACM) message indicating that the terminating end is available to receive the call.

4. A method of providing answer supervision in a switched telephone network as claimed in claim 3 wherein the payload traffic is a voice, data or facsimile transmission.

5. A method of providing answer supervision in a switched telephone network as claimed in claim 1 wherein the step of generating at least one predetermined common channel signaling message involves generating an Answer (ANM) message at a Virtual Network Element (VNE) in a call path for the call, the ANM message being sent from the VNE in an originating direction of the call in order to provide the ANM message expected by the originating end of the call.

6. A method of providing answer supervision in a switched telephone network as claimed in claim 1 wherein the step of generating at least one predetermined common channel signaling message involves generating first and second Release (REL) messages at a Virtual Network Element (VNE) in a call path for the call, the first REL message being sent from the VNE towards an originating end of the call and the second REL message being sent from the VNE towards a terminating end of the call in order to cancel the call.

7. A method of providing answer supervision in a switched telephone network as claimed in claim 1 wherein the common channel signaling systems operates under a Signaling System 7 protocol.

8. A method of providing answer supervision in a switched telephone network as claimed in claim 7 wherein the common channel signaling messages are Integrated Services Digital Network User Part (ISUP) messages.

9. A method of providing answer supervision for toll calls in a switched telephone network, comprising the steps of:

monitoring common channel signaling links to detect call control messages;

copying call control messages to a data processing unit which tallies the messages to track the progress of individual calls;

determining at the data processing unit when the progress of an individual toll call fails to conform to an expected call pattern because the switched telephone network does not recognize the call as having been answered; and acting to control the individual call or acting to ensure that other calls to a same called number as the individual call are routed to ensure that they may be controlled.

10. A method of providing answer supervision for toll calls in a switched telephone network as claimed in claim 9 wherein the common channel signaling links are monitored by monitors connected to the signaling links in the network.

11. A method of providing answer supervision for toll calls in a switched telephone network as claimed in claim 9 wherein the common channel signaling links are monitored by an Intelligent Signal Transfer Point (ISTP).

12. A method of providing answer supervision for toll calls in a switched telephone network as claimed in claim 9 wherein the data processing unit maintains a table of calls in progress, the table including call records indicating a time when a call was initiated and a current status of the call.

13. A method of providing answer supervision for toll calls in a switched telephone network as claimed in claim 12 wherein a call record is deleted from the table when an answer message related to the call is copied to the data processing unit.

14. A method of providing answer supervision for toll calls in a switched telephone network as claimed in claim 12 wherein the data processing unit sends an alert message to an Answer Supervision Controller (ASC) when a predetermined criteria indicates that a call in the table does not conform to an expected call pattern.

15. A method of providing answer supervision for toll calls in a switched telephone network as claimed in claim 14 wherein the individual toll call fails to conform to the expected call pattern due to an elapse of a predetermined time interval after the receipt of a message indicting that the terminating number for the call is available and before a call answer or release message is received.

16. A method of providing answer supervision for toll calls in a switched telephone network as claimed in claim 14 wherein on receipt of the alert message, the ASC forwards instructions to an Operations Support System (OSS) requesting that future calls to a called number for the individual call be routed over a monitored facility.

17. A method of providing answer supervision for toll calls in a switched telephone network as claimed in claim 16 wherein the monitored facility is a loop-back trunk group at a network switching point that services the called number.

18. A method of providing answer supervision for toll calls in a switched telephone network as claimed in claim 17 wherein the loop-back trunk group is monitored by a monitor that can detect voice, data or facsimile transmissions.

19. A method of providing answer supervision for toll calls in a switched telephone network as claimed in claim 16 wherein the OSS routes calls over the monitored facility by updating translation tables in the network switching node.

20. A method of providing answer supervision for toll calls in a switched telephone network as claimed in claim 17 wherein a Virtual Network Element (VNE) is a virtual switching node in the loop-back trunk group and a physical node in the common channel signaling network.

21. A method of providing answer supervision for toll calls in a switched telephone network as claimed in claim 20 wherein when voice, data or facsimile traffic is detected on a call to the called number before the call is answered or released, the VNE generates at least one common channel signaling message to control the call.

22. A method of providing answer supervision for toll calls in a switched telephone network as claimed in claim 21 wherein the at least one common channel signaling message for controlling the call is an Answer (ANM) message sent from the VNE to a switching node in an originating direction of the call so that a billing process for the call is initiated.

23. A method of providing answer supervision for toll calls in a switched telephone network as claimed in claim 21 wherein the at least one common channel signaling message for controlling the call is a Release (REL) message sent from the VNE to a switching node in an originating direction of the call and an REL message sent in a terminating direction of the call so that the call is terminated.

24. A system for providing answer supervision for toll calls in a switched telephone network, comprising:

a signal link monitor for monitoring at least one common channel signaling link in a common channel signaling system for controlling the switched telephone network to track the progress of individual calls having control messages carried by the at least one common channel signaling link; and means for generating common channel signaling messages and transmitting the common channel signaling messages into the common channel signaling network to control the progress of calls determined by the means for monitoring to be calls which do not conform to an expected call pattern respecting call answer.

25. A system for providing answer supervision for toll calls in a switched telephone network as claimed in claim 24 wherein the means for monitoring comprises in combination:

the signal link monitor copies common channel signaling call control messages to an Answer Supervision Analyzer (ASA) which tracks the progress of individual calls; and an Answer Supervision Controller (ASC) receives alert messages from the ASA when an individual call satisfies a predetermined criteria.

26. A system for providing answer supervision for toll calls in a switched telephone network as claimed in claim 25 wherein the ASA and the ASC are implemented on the same data processing unit.

27. A system for providing answer supervision for toll calls in a switched telephone network as claimed in claim 25 wherein the ASA and the ASC are implemented on different data processing units.

28. A system for providing answer supervision for toll calls in a switched telephone network as claimed in claim 24 wherein the means for generating common channel signaling messages comprises a Virtual Network element (VNE) which is a virtual node in the switched telephone network and a physical node in the common channel signaling system.

29. A system for providing answer supervision for toll calls in a switched telephone network as claimed in claim 24 wherein the means for generating common channel signaling messages comprises an Intelligent Signal Transfer Point (ISTP) which is a virtual node in the switched telephone network and a physical node in the common channel signaling system.

30. A system for providing answer supervision for toll calls in a switched telephone network as claimed in claim 28 wherein the system further comprises a loop-back trunk group at a network switching node which serves a called number for calls which do not conform to the expected call pattern.

31. A system for providing answer supervision for toll calls in a switched telephone network as claimed in claim 30 wherein the loop-back trunk group is a monitored facility and a monitor for monitoring the loop-back trunk group is adapted to detect voice, data or facsimile payload traffic.

32. A system for providing answer supervision for toll calls in a switched telephone network as claimed in claim 30 wherein the VNE is a virtual switching node in the loop-back trunk group.

33. A system for providing answer supervision for toll calls in a switched telephone network as claimed in claim 25 wherein the system further comprises an Operations Support System (OSS) which receives messages from the ASC requesting that future calls to a called number be routed over a monitored facility and the OSS updates translation tables in a switching node that serves the called number to route the calls over the monitored facility.

34. A system for providing answer supervision for toll calls in a switched telephone network as claimed in claim 33 wherein the monitored facility is a loop-back trunk at the switching node that serves the called number.

35. A system for providing answer supervision for calls switched through gateway switches that interconnect switched telephone networks, comprising:

monitors for monitoring signaling links carrying call control messages for calls switched through the gateway switches, the monitors being enabled to copy at least a portion of the call control messages to a data processor connected to a data network;

the data processor being enabled to track the progress of individual calls switched through the gateway switches by analyzing the call control messages; and means for generating signaling messages to control individual calls switched through the gateway switches if a call does not conform to an expected call pattern.

36. The system for providing answer supervision as claimed in claim 35 wherein the means for generating signaling messages comprises a Virtual Network Element (VNE) which is a physical node in a signaling network for the call control messages, the VNE receiving call information and instructions from the data processor.

37. The system for providing answer supervision as claimed in claim 36 further including a second data processor which receives an alert message through the data network when the call does not conform to the expected call pattern, and the second data processor sends the call information and instructions to the VNE.

38. The system for providing answer supervision as claimed in claim 35 wherein the system further includes voice path monitors connected to trunks served by the gateway switches, the voice path monitors being enabled to determine whether any trunk member to which they are connected carries voice, data or facsimile payload.

* * * * *